(12) United States Patent
Ryaboy et al.

(10) Patent No.: US 7,320,455 B2
(45) Date of Patent: Jan. 22, 2008

(54) INSTRUMENTED PLATFORM FOR VIBRATION-SENSITIVE EQUIPMENT

(75) Inventors: Vyacheslav M. Ryaboy, Irvine, CA (US); Warren Booth, Laguna Hills, CA (US)

(73) Assignee: Newport Corporation, Irvine, CA (US)

( * ) Notice: Subject to any disclaimer, the term of this patent is extended or adjusted under 35 U.S.C. 154(b) by 0 days.

(21) Appl. No.: 10/693,222

(22) Filed: Oct. 24, 2003

(65) Prior Publication Data

US 2005/0109914 A1    May 26, 2005

(51) Int. Cl.
*F16M 11/00* (2006.01)
(52) U.S. Cl. ........................... 248/638; 248/678
(58) Field of Classification Search ............... 248/638, 248/559, 550, 678; 73/663, 664, 666, 668
See application file for complete search history.

(56) References Cited

U.S. PATENT DOCUMENTS

| | | |
|---|---|---|
| 1,143,165 A | 6/1915 | Begusch |
| 1,306,906 A | 6/1919 | Jaques, Sr. |
| 2,351,386 A | 6/1944 | Zucker |
| 2,367,139 A | 1/1945 | Ress |
| 3,357,268 A | 12/1967 | Richter |
| 3,442,475 A | 5/1969 | Rivin |
| 3,460,786 A | 8/1969 | Rivin |
| 3,478,608 A | 11/1969 | Met |
| 3,533,012 A | 10/1970 | Johnson et al. |
| 3,565,515 A | 2/1971 | De Mey, II |
| 3,577,791 A | 5/1971 | Vanden Broek |
| 3,578,278 A | 5/1971 | Pickering |
| 3,601,476 A | 8/1971 | MacKenzie |
| 3,620,558 A | 11/1971 | MacMillan |
| 3,667,525 A | 6/1972 | Spieth |

(Continued)

FOREIGN PATENT DOCUMENTS

CA       2199423       3/1996

(Continued)

OTHER PUBLICATIONS

J. M. Kahn, C. A. Burrus, and G. Raybon, High-Stability 1.5 um External-Cavity Semiconductor Lasers for Phase-Lock Applications, Photonics Technology Letters, vol. 1. No. 7, Jul. 1989.

(Continued)

*Primary Examiner*—Carl D. Friedman
*Assistant Examiner*—Steven M. Marsh
(74) *Attorney, Agent, or Firm*—Ben Yorks; Irell & Manella; Brian F. Swienton (57) ABSTRACT

A platform that includes a vibration sensor located within an inner core of a table. The table may have a first plate that supports a vibration-sensitive payload. The first plate may be separated from a second plate by the inner core. The sensor can be located within the core directly below the device. The sensor can be connected to an electrical connector attached to an external surface of the table. A monitor can be readily plugged into the electrical connector to obtain vibration data from the sensor. The platform may also include a damper located within the inner core to reduce vibration of the table. The damper may be an active device that is connected to control circuits located within, or outside, the inner core.

18 Claims, 5 Drawing Sheets

U.S. PATENT DOCUMENTS

| | | | |
|---|---|---|---|
| 3,751,025 A | 8/1973 | Beery et al. | |
| 3,784,146 A | 1/1974 | Mathews | |
| 3,917,201 A | 11/1975 | Roll | |
| 3,945,246 A | 3/1976 | Wadensten | |
| 3,989,358 A | 11/1976 | Melmoth | |
| 4,030,811 A | 6/1977 | Khoe et al. | |
| 4,065,203 A | 12/1977 | Goell et al. | |
| 4,079,404 A | 3/1978 | Comerford et al. | |
| 4,088,396 A | 5/1978 | Edelstein | |
| 4,119,363 A | 10/1978 | Camlibel et al. | |
| 4,144,504 A | 3/1979 | Leggett et al. | |
| 4,146,329 A | 3/1979 | King et al. | |
| 4,164,151 A * | 8/1979 | Nolan et al. | 73/663 |
| 4,164,363 A | 8/1979 | Hsu | |
| 4,167,744 A | 9/1979 | Nyul | |
| 4,199,222 A | 4/1980 | Ikushima et al. | |
| 4,237,474 A | 12/1980 | Ladany | |
| 4,268,113 A | 5/1981 | Noel, Jr. | |
| 4,295,152 A | 10/1981 | Khoe et al. | |
| 4,296,998 A | 10/1981 | Dufft | |
| 4,316,678 A | 2/1982 | F'Geppert | |
| 4,332,469 A | 6/1982 | Wendland | |
| 4,350,867 A | 9/1982 | Kinoshita et al. | |
| 4,355,323 A | 10/1982 | Kock | |
| 4,357,072 A | 11/1982 | Goodfellow et al. | |
| 4,387,956 A | 6/1983 | Cline | |
| 4,403,243 A | 9/1983 | Hakamada | |
| 4,435,037 A | 3/1984 | Abramson et al. | |
| 4,469,399 A | 9/1984 | Cowen et al. | |
| 4,469,929 A | 9/1984 | Rosen et al. | |
| 4,479,698 A | 10/1984 | Landis et al. | |
| 4,494,720 A | 1/1985 | Gregory et al. | |
| 4,500,032 A | 2/1985 | Ackerman | |
| 4,500,165 A | 2/1985 | Scholl et al. | |
| 4,506,108 A | 3/1985 | Kersch et al. | |
| 4,514,849 A | 4/1985 | Witte et al. | |
| 4,515,337 A | 5/1985 | Torras | |
| 4,523,802 A | 6/1985 | Sakaguchi et al. | |
| 4,523,810 A | 6/1985 | Goss et al. | |
| 4,525,659 A | 6/1985 | Imahashi et al. | |
| 4,550,410 A | 10/1985 | Chenausky et al. | |
| 4,576,480 A | 3/1986 | Travis | |
| 4,586,743 A | 5/1986 | Edwards et al. | |
| 4,615,031 A | 9/1986 | Eales et al. | |
| 4,618,759 A | 10/1986 | Muller et al. | |
| 4,621,006 A * | 11/1986 | Terry et al. | 428/116 |
| 4,623,220 A | 11/1986 | Grabbe et al. | |
| 4,645,171 A | 2/1987 | Heide | |
| 4,647,147 A | 3/1987 | Pikulski et al. | |
| 4,647,331 A | 3/1987 | Koury, Jr. et al. | |
| 4,656,641 A | 4/1987 | Scifres et al. | |
| 4,657,429 A | 4/1987 | Morris | |
| 4,664,732 A | 5/1987 | Campbell et al. | |
| 4,673,244 A | 6/1987 | Miles | |
| 4,673,245 A | 6/1987 | Kling et al. | |
| 4,677,290 A | 6/1987 | Mitch | |
| 4,678,271 A | 7/1987 | Beaulieu | |
| 4,679,908 A | 7/1987 | Goodwin | |
| 4,687,287 A | 8/1987 | Lukas et al. | |
| 4,701,013 A | 10/1987 | Jurczyszyn et al. | |
| 4,702,556 A | 10/1987 | Ishii et al. | |
| 4,706,920 A | 11/1987 | Ojima et al. | |
| 4,708,429 A | 11/1987 | Clark et al. | |
| 4,714,315 A | 12/1987 | Krause | |
| 4,720,163 A | 1/1988 | Goodwin et al. | |
| 4,729,239 A * | 3/1988 | Gordon | 73/593 |
| 4,746,195 A | 5/1988 | Auracher et al. | |
| 4,747,657 A | 5/1988 | Chaoui et al. | |
| 4,748,632 A | 5/1988 | Preston | |
| 4,759,600 A | 7/1988 | Caron et al. | |
| 4,763,979 A | 8/1988 | Heywang | |
| 4,767,174 A | 8/1988 | Carenco et al. | |
| 4,773,730 A | 9/1988 | Sedlmayr | |
| 4,779,946 A | 10/1988 | Pimpinella et al. | |
| 4,779,959 A | 10/1988 | Saunders | |
| 4,782,223 A | 11/1988 | Suzuki | |
| 4,787,691 A | 11/1988 | Lorenzo et al. | |
| 4,800,262 A | 1/1989 | Lentine | |
| 4,807,750 A | 2/1989 | Ryder et al. | |
| 4,818,173 A | 4/1989 | Khusro | |
| 4,823,220 A | 4/1989 | Milster et al. | |
| 4,837,768 A | 6/1989 | Schmid | |
| 4,839,961 A | 6/1989 | Vermeer | |
| 4,842,397 A | 6/1989 | Eisler | |
| 4,850,261 A | 7/1989 | Greene | |
| 4,850,671 A | 7/1989 | Finzel | |
| 4,854,667 A | 8/1989 | Ebata et al. | |
| 4,870,631 A | 9/1989 | Stoddard | |
| 4,881,863 A | 11/1989 | Braginsky | |
| 4,890,715 A | 1/1990 | Sticht | |
| 4,913,527 A | 4/1990 | Jessop | |
| 4,914,797 A | 4/1990 | Tsuchida et al. | |
| 4,914,867 A | 4/1990 | Saito et al. | |
| 4,915,482 A | 4/1990 | Collins et al. | |
| 4,916,635 A | 4/1990 | Singer et al. | |
| 4,938,564 A | 7/1990 | Romero | |
| 4,947,335 A | 8/1990 | Blitchington | |
| 4,966,474 A | 10/1990 | Geiger | |
| 4,978,910 A | 12/1990 | Knox et al. | |
| 4,987,293 A | 1/1991 | Baciak | |
| 4,988,159 A | 1/1991 | Turner et al. | |
| 4,988,165 A | 1/1991 | Ishii et al. | |
| 5,000,415 A | 3/1991 | Sandercock | |
| 5,033,061 A | 7/1991 | Hobart et al. | |
| 5,044,719 A | 9/1991 | Nakamura | |
| 5,058,124 A | 10/1991 | Cameron et al. | |
| 5,058,868 A | 10/1991 | Sirven | |
| 5,061,541 A | 10/1991 | Gertel | |
| 5,062,012 A | 10/1991 | Maeda et al. | |
| 5,068,749 A | 11/1991 | Patel | |
| 5,069,527 A | 12/1991 | Johnston, Jr. et al. | |
| 5,071,108 A | 12/1991 | Houghton, Jr. | |
| 5,074,021 A | 12/1991 | Feng et al. | |
| 5,077,747 A | 12/1991 | Hemmer et al. | |
| RE33,937 E | 5/1992 | Schubert | |
| 5,116,190 A | 5/1992 | Silke | |
| 5,132,824 A | 7/1992 | Patel et al. | |
| 5,138,496 A | 8/1992 | Pong | |
| 5,140,470 A | 8/1992 | Luecke | |
| 5,146,532 A | 9/1992 | Hodge | |
| 5,150,236 A | 9/1992 | Patel | |
| 5,154,963 A | 10/1992 | Terry | |
| 5,168,168 A | 12/1992 | Luecke | |
| 5,170,104 A * | 12/1992 | Laughlin | 318/135 |
| 5,172,160 A | 12/1992 | Van Eijk et al. | |
| 5,179,618 A | 1/1993 | Anton | |
| 5,183,350 A | 2/1993 | Kramer | |
| 5,189,725 A | 2/1993 | Bensel, III et al. | |
| 5,191,587 A | 3/1993 | Hanson et al. | |
| 5,194,993 A | 3/1993 | Bedzyk | |
| 5,195,157 A | 3/1993 | Penfold | |
| 5,214,735 A | 5/1993 | Henneberger et al. | |
| 5,218,258 A | 6/1993 | Shirasu et al. | |
| 5,218,610 A | 6/1993 | Dixon | |
| 5,219,051 A | 6/1993 | Davis | |
| 5,245,552 A | 9/1993 | Andersson et al. | |
| 5,251,863 A | 10/1993 | Gossman et al. | |
| 5,281,812 A | 1/1994 | Lee et al. | |
| 5,285,995 A | 2/1994 | Gonzalez et al. | |
| 5,289,559 A | 2/1994 | Wilson | |
| 5,300,755 A | 4/1994 | Nishitani et al. | |
| 5,311,278 A | 5/1994 | Rosencher | |
| 5,319,435 A | 6/1994 | Melle et al. | |
| 5,321,539 A | 6/1994 | Hirabayashi et al. | |

| | | |
|---|---|---|
| 5,327,061 A | 7/1994 | Gullapalli |
| 5,337,383 A | 8/1994 | DeAngelis et al. |
| 5,340,371 A | 8/1994 | Dyott |
| 5,367,140 A | 11/1994 | Jouaneh et al. |
| 5,410,145 A | 4/1995 | Coroy |
| 5,412,991 A * | 5/1995 | Hobbs .......................... 73/663 |
| 5,428,225 A | 6/1995 | Silva et al. |
| 5,428,635 A | 6/1995 | Zhiglinsky et al. |
| 5,434,790 A | 7/1995 | Saka et al. |
| 5,434,944 A | 7/1995 | Kerry et al. |
| 5,434,945 A | 7/1995 | Burek et al. |
| 5,442,167 A | 8/1995 | Cornelius et al. |
| 5,446,519 A | 8/1995 | Makinouchi |
| 5,463,647 A | 10/1995 | Pan |
| 5,469,265 A | 11/1995 | Measures et al. |
| 5,483,055 A | 1/1996 | Thompson et al. |
| 5,499,261 A | 3/1996 | Welch et al. |
| 5,500,269 A * | 3/1996 | Terry .......................... 428/116 |
| 5,502,598 A | 3/1996 | Kimura et al. |
| 5,510,603 A | 4/1996 | Hess et al. |
| 5,517,857 A * | 5/1996 | Hobbs .......................... 73/571 |
| 5,528,718 A | 6/1996 | Ray et al. |
| 5,530,547 A | 6/1996 | Arnold |
| 5,530,785 A | 6/1996 | Sakamoto et al. |
| 5,553,186 A | 9/1996 | Allen |
| 5,563,972 A | 10/1996 | Krausse et al. |
| 5,564,537 A | 10/1996 | Shoureshi |
| 5,570,444 A | 10/1996 | Janssen et al. |
| 5,581,077 A | 12/1996 | Chirovsky et al. |
| 5,598,500 A | 1/1997 | Crespel et al. |
| 5,603,387 A | 2/1997 | Beard et al. |
| 5,617,501 A | 4/1997 | Miller et al. |
| 5,619,609 A | 4/1997 | Pan et al. |
| 5,626,157 A * | 5/1997 | Galpin et al. ............ 134/115 R |
| 5,638,267 A | 6/1997 | Singhose et al. |
| 5,638,482 A | 6/1997 | Winterhoff et al. |
| 5,653,317 A | 8/1997 | Wakui |
| 5,653,894 A | 8/1997 | Ibbotson et al. |
| 5,654,903 A | 8/1997 | Reitman et al. |
| 5,655,045 A | 8/1997 | Morlion et al. |
| 5,660,255 A | 8/1997 | Schubert et al. |
| 5,668,906 A | 9/1997 | Yamamura et al. |
| 5,673,350 A | 9/1997 | Song et al. |
| 5,689,607 A | 11/1997 | Vincent et al. |
| 5,695,331 A | 12/1997 | Nutter et al. |
| 5,705,802 A | 1/1998 | Bobba et al. |
| 5,717,804 A | 2/1998 | Pan et al. |
| 5,725,066 A | 3/1998 | Beard et al. |
| 5,737,132 A | 4/1998 | Luecke et al. |
| 5,745,633 A | 4/1998 | Giebel et al. |
| 5,745,987 A | 5/1998 | Bartley et al. |
| 5,748,821 A | 5/1998 | Schempp et al. |
| 5,757,561 A | 5/1998 | Sechrist et al. |
| 5,758,004 A | 5/1998 | Alarcon et al. |
| 5,761,360 A | 6/1998 | Grois et al. |
| 5,764,678 A | 6/1998 | Tada |
| 5,765,800 A * | 6/1998 | Watanabe et al. ........... 248/550 |
| 5,768,768 A | 6/1998 | Best |
| 5,774,614 A | 6/1998 | Gilliland et al. |
| 5,779,010 A | 7/1998 | Nelson |
| 5,791,621 A | 8/1998 | Yashima |
| 5,793,920 A | 8/1998 | Wilkins et al. |
| 5,793,921 A | 8/1998 | Wilkins et al. |
| 5,794,912 A | 8/1998 | Whittaker et al. |
| 5,795,912 A | 8/1998 | Tsubota |
| 5,812,958 A | 9/1998 | Mayama |
| 5,823,307 A | 10/1998 | Schubert et al. |
| 5,825,558 A | 10/1998 | Farmiga et al. |
| 5,851,877 A | 12/1998 | Ho et al. |
| 5,852,519 A | 12/1998 | Do et al. |
| 5,857,049 A | 1/1999 | Beranek et al. |
| 5,880,461 A | 3/1999 | Spear |
| 5,880,465 A | 3/1999 | Boettner et al. |
| 5,880,894 A | 3/1999 | Blakley |
| 5,884,736 A | 3/1999 | Burdisso et al. |
| 5,909,324 A | 6/1999 | Bryant et al. |
| 5,912,442 A * | 6/1999 | Nye et al. .................... 181/292 |
| 5,930,057 A | 7/1999 | Sechrist et al. |
| 5,941,508 A | 8/1999 | Murata et al. |
| 5,941,920 A | 8/1999 | Schubert |
| 5,946,023 A | 8/1999 | Blanding |
| 5,962,104 A | 10/1999 | Gertel et al. |
| 5,963,695 A | 10/1999 | Joyce |
| 5,969,256 A * | 10/1999 | Hobbs .......................... 73/663 |
| 6,014,206 A | 1/2000 | Basting et al. |
| 6,016,230 A | 1/2000 | Nunnally et al. |
| 6,022,005 A | 2/2000 | Gran et al. |
| 6,026,550 A | 2/2000 | Silano |
| 6,056,447 A | 5/2000 | Caras |
| 6,078,845 A | 6/2000 | Friedman |
| 6,087,621 A | 7/2000 | Kang et al. |
| 6,184,987 B1 | 2/2001 | Jang et al. |
| 6,198,580 B1 | 3/2001 | Dallakian |
| 6,202,492 B1* | 3/2001 | Ohsaki .......................... 73/662 |
| 6,209,841 B1 | 4/2001 | Houghton, Jr. et al. |
| 6,212,759 B1 | 4/2001 | Liu et al. |
| 6,220,100 B1* | 4/2001 | Felkins et al. ................. 73/663 |
| 6,222,665 B1 | 4/2001 | Neuner et al. |
| 6,240,398 B1 | 5/2001 | Allen et al. |
| 6,241,435 B1* | 6/2001 | Huang et al. ................ 409/141 |
| 6,286,644 B1* | 9/2001 | Wakui .......................... 188/378 |
| 6,304,393 B1 | 10/2001 | Sechrist et al. |
| 6,311,478 B1 | 11/2001 | Elorriaga Vicario et al. |
| 6,317,278 B1 | 11/2001 | Metsala |
| 6,390,887 B1 | 5/2002 | Ulloa |
| 6,394,407 B1 | 5/2002 | Ryaboy |
| 6,417,976 B1 | 7/2002 | Schuster et al. |
| 6,441,895 B1 | 8/2002 | Kogan et al. |
| 6,474,712 B1 | 11/2002 | Govzman et al. |
| 6,490,025 B1 | 12/2002 | Makinouchi et al. |
| 6,511,035 B1* | 1/2003 | Teel et al. .................... 248/550 |
| 6,626,411 B2 | 9/2003 | Houghton, Jr. et al. |
| 6,700,304 B1* | 3/2004 | Fuller et al. ................. 310/321 |
| 2001/0022793 A1 | 9/2001 | Yokoyama |
| 2002/0145102 A1 | 10/2002 | Eckelkamp-Baker et al. |
| 2002/0186508 A1 | 12/2002 | Kube et al. |

FOREIGN PATENT DOCUMENTS

| | | |
|---|---|---|
| GB | 2 124 402 A | 7/1982 |
| GB | 2 131 971 A | 6/1984 |
| JP | 03021897 | 1/1991 |
| JP | 6-33981 A | 2/1994 |
| JP | 08088167 | 9/1994 |
| JP | 09330875 | 6/1996 |
| JP | 10144601 | 11/1996 |
| WO | WO/96-07118 | 3/1996 |

OTHER PUBLICATIONS

P. Zorabedian and W. R. Trutna, Jr., "Interference-filter-tuned, alignment-stabilized, semiconductor external-cavity laser", 1988, Optical Society of America.

A. Schremer and C. L. Tang, "Single-Frequency tunable external-cavity semiconductor laser using an electro-optic birefringent modulator", Appl. Phys. Lett., vol. 55, No. 1, Jul. 3, 1989.

M. W. Maeda, J. S. Patel, D. A. Smith, Chinlon Lin, M. A. Saifi, and A. Von Lehman, "An Electronically Tunable Fiber Laser with a Liquid-Crystal Etalon Filter as the Wavelength-Tuning Element", IEEE Photonics Technology Letters, vol. 2, No. 11, Nov. 1990.

Kutsuhiko Hirabayashi, Hiroyuki Tsuda, and Takashi Kurokawa, "Tunable Liquid-Crystal Fabry-Perol Interferometer Filter for Wavelength-Division Multiplexing Communication Systems", Journal of Lightwave Technology, vol. 11, No. 12, Dec. 1993.

Stephen R. Mallinson, "Wavelength-selective filters for single-mode fiber WDM systems using Fabry-Perot interferometers", Applied Optics, vol. 26, No. 3, Feb. 1, 1987.

W. Gunning, J. Pasko, J. Tracy, "A liquid crystal tunable spectral filter: visible and infrared operation", SPIE vol. 268 Imaging Spectroscopy (1981).

Hiroyuki Tsuda, Katsuhiko Hirabayashi, Yuichi Tohmori, and Takashi Kurokawa, "Tunable Light Source Using a Liquid-Crystal Fabry-Perot Interferometer", IEEE Photonics Technology Letters, vol. 3. No. 6. Jun. 1991.

John R. Andrews, "Low Voltage Wavelength Tuning of an External Cavity Diode Laser Using a Nematic Liquid Crystal-Containing Birefringent Filert", IEEE Photonics Technology Letters. vol. 2, No. 5, May 1990.

N. A. Olsson and J. P. Van Der Ziel, "Performance Characteristics of 1.5-um External Cavity Semiconductor Lasers for Coherent Optical Communication", Journal Of Lightwave Technology, vol. LT-5. No. 4, Apr. 1987.

Hecht Optics Second Edition, Eugene Hecht, reprinted 1990, reference text, pp. 303 # 368.

Rivin, Eugene I., "Vibration isolation of precision equipment", Precision Engineering, 1995, pp. 41-56, vol. 17.

"Marsh Mellow Springs Vibration Isolation Design Manual", 1998, Firestone Industrial Products Company.

Riven, Eugene I., "Shaped Elastomeric Components for Vibration Control Devices", Sound and Vibration, Jul. 1999, pp. 18-23, vol. 33, No. 7.

Grafstrom, S. et al., "Fast Laser Beam Position Control with Submicroradian Precision," Optics Communications, Jan. 1988, vol. 65, No. 2.

Newport Corporation, "The Newport Resource" catalog, 2003, pp. 1176-1177; 1215-1219.

C.M. Harris, "Shock and Vibration Handbook", 4th edition, 1996; 5th edition, 2001, Ch. 37.

* cited by examiner

INSTRUMENTED PLATFORM FOR VIBRATION-SENSITIVE EQUIPMENT

BACKGROUND OF THE INVENTION

1. Field of the Invention

The subject matter disclosed generally relates to industrial tables such as optical tables.

2. Background Information

There have been developed various tables for industrial use such as optical bench tables or vibration shaker tables. U.S. Pat. No. 5,154,963 issued to Terry discloses an industrial table that has a top plate, a bottom plate and a honeycomb structure that separates the plates. The honeycomb structure allows for threaded apertures in the top plate. External vibration-sensitive payload devices such as an optical component of an optical system, or a device under test in a shaker system, can be attached to the threaded apertures of the table.

In many experimental research and industrial applications it is desirable to isolate the table from external vibration such as the natural tremor of the building structure. U.S. Pat. No. 6,209,841 issued to Houghton et al. discloses an active isolation module that can be placed between the building floor and a table to dampen table vibration. The isolator includes a vibration sensor and an actuator that are connected to a controller. The sensor senses vibration and provides an output signal to the controller. The controller then processes the output signal and provides a drive signal to excite the actuator and offset the vibration.

The vibration isolators reduce the vibration transmitted to the table from the floor. The table top itself, however, has its own natural frequencies and corresponding flexural vibration modes that can be easily excited by residual vibration coming through the isolators or by other sources such as acoustical excitation, air turbulence and dynamic forces generated by the payload equipment installed on the table. The main flexural vibration modes usually have a global character, which means that an excitation at any point of the table generates a vibration pattern encompassing the whole table surface. Those natural vibrations are very lightly damped and therefore can reach high amplitudes unless special damping means are introduced into the table structure.

Passive dampers of various designs are widely used in construction of optical tables. The "Shock and Vibration Handbook", ed. By C. M. Harris, $4^{th}$ edition, 1996; $5^{th}$ edition, 2001, Ch. 37, provides a survey of the state of the art in this field and a classification of dampers (damping treatments). According to it, the known types of damping treatments include:

Free-layer damping treatments, where the energy is dissipated by means of extensional deformation of a damping layer (made of visco-elastic material) induced by flexural vibration of the base structure.

Constrained-layer damping treatments, where the constraining layer helps induce relatively large shear deformations in the visco-elastic layer in response to flexural vibration of the base structure, thereby providing more effective energy dissipation mechanism.

Integral damping treatments, including use of damped laminated sheets and/or damped joints in the construction assembly.

Tuned dampers, which are essentially mass-spring systems having resonances matched (tuned) to the resonance frequency of the base structure. The application of the tuned damper replaces the resonance peak of the base structure, typically, by two peaks of lesser amplitude.

Damping links, i.e., visco-elastic elements joining tow parts of the structure that experience large relative motion in the process of vibration.

Some of cited damping techniques have found applications in optical tables. In particular, Newport Corporation (see "The Newport Resource" catalog by Newport Corporation, 2003) uses tuned dampers, constrained layer treatment of work surfaces and integral damping in its optical table designs.

Nevertheless, the growing demand for high precision and high throughput in optoelectronics and semiconductor industries, as well as the needs of modern scientific experimental instruments, require higher damping performance of optical tables than that achieved by the methods and devices known in the state of the art. Active vibration control means are known to be able to achieve superior performance compared to passive control.

It is sometimes desirable to monitor the vibration level on the table. For example, in a precision measurement system the real-time vibration data could qualify or disqualify a certain measurement. In a precision manufacturing system, the real-time vibration data could indicate an increased probability of a particular manufactured item, such as a semiconductor wafer, being defective. Vibration monitoring is also necessary if the table in question is part of a vibration test setup.

The vibration signal may be used merely to indicate increased vibration levels on the platform during certain periods of time. In this case the vibration sensors can be placed at almost any point of the table because of the global character of main vibration modes; the areas near the corners of the table represent a good place for vibration sensors since these areas are responsive to all typical vibration modes of the table top. In other cases, the exact value of vibration input at a critical vibration-sensitive equipment location is of interest. In this situation the sensors should be placed immediately adjacent to the attachment points of the vibration-sensitive equipment.

Deployment of vibration measurement systems, including sensors and cables, on the working surface of the table would detract from the valuable payload space. It may be impossible to place the sensors near the most vibration-sensitive pieces of equipment due to space restrictions. In a production environment it may be impractical due to required set-up time. Therefore, a system monitoring the vibration of the table while leaving its surface clear and accessible to the user would be very desirable.

The essentials of the optical table design are disclosed in the U.S. Pat. Nos. 4,621,006, entitled "Honeycomb table manufacture and clean-room compatible honeycomb tables" issued to Terry et al. and U.S. Pat. No. 5,500,269, entitled "Honeycomb table manufacture and clean-room compatible honeycomb tables" issued to Terry. Additional details and variations can be found in U.S. Pat. No. 4,645,171, entitled "Honeycomb tabletop" issued to Heide, U.S. Pat. No. 5,061,541, entitled "Honeycomb tables" issued to Gertel, U.S. Pat. No. 5,626,157, entitled "Optical table" issued to Galpin et al. and U.S. Pat. No. 5,962,104, entitled "Optical Table" issued to Gertel et al. For an extensive general description of optical honeycomb tables, reference may be made to the 2000 Vibration Control Catalog and 2002-2003 "The Newport Resource" Catalogs by Newport Corporation. Catalogs of TMC, Kinetic Systems and other manufacturers also contain descriptions of optical table designs. Although the main purpose of an optical table is to provide a stable platform for vibration-sensitive equipment, none of the designs described in the aforementioned patents and catalogs include a built-in means for monitoring vibration, or a table that includes active vibration control.

BRIEF SUMMARY OF THE INVENTION

A platform that includes a vibration sensor located within an inner core of a table.

DETAILED DESCRIPTION

Disclosed is a platform that includes a vibration sensor located within an inner core of a table. The table may have a first plate that supports a vibration-sensitive payload. The first plate may be separated from a second plate by the inner core. The sensor can be located within the core directly below the device. The sensor can be connected to an electrical connector attached to an external surface of the table. A monitor can be readily plugged into the electrical connector to obtain vibration data from the sensor. The platform may also include a damper located within rho inner core to reduce vibration of the table. The damper may be an active device that is connected to control circuits located within, or outside, the inner core.

Figures 1, 2:
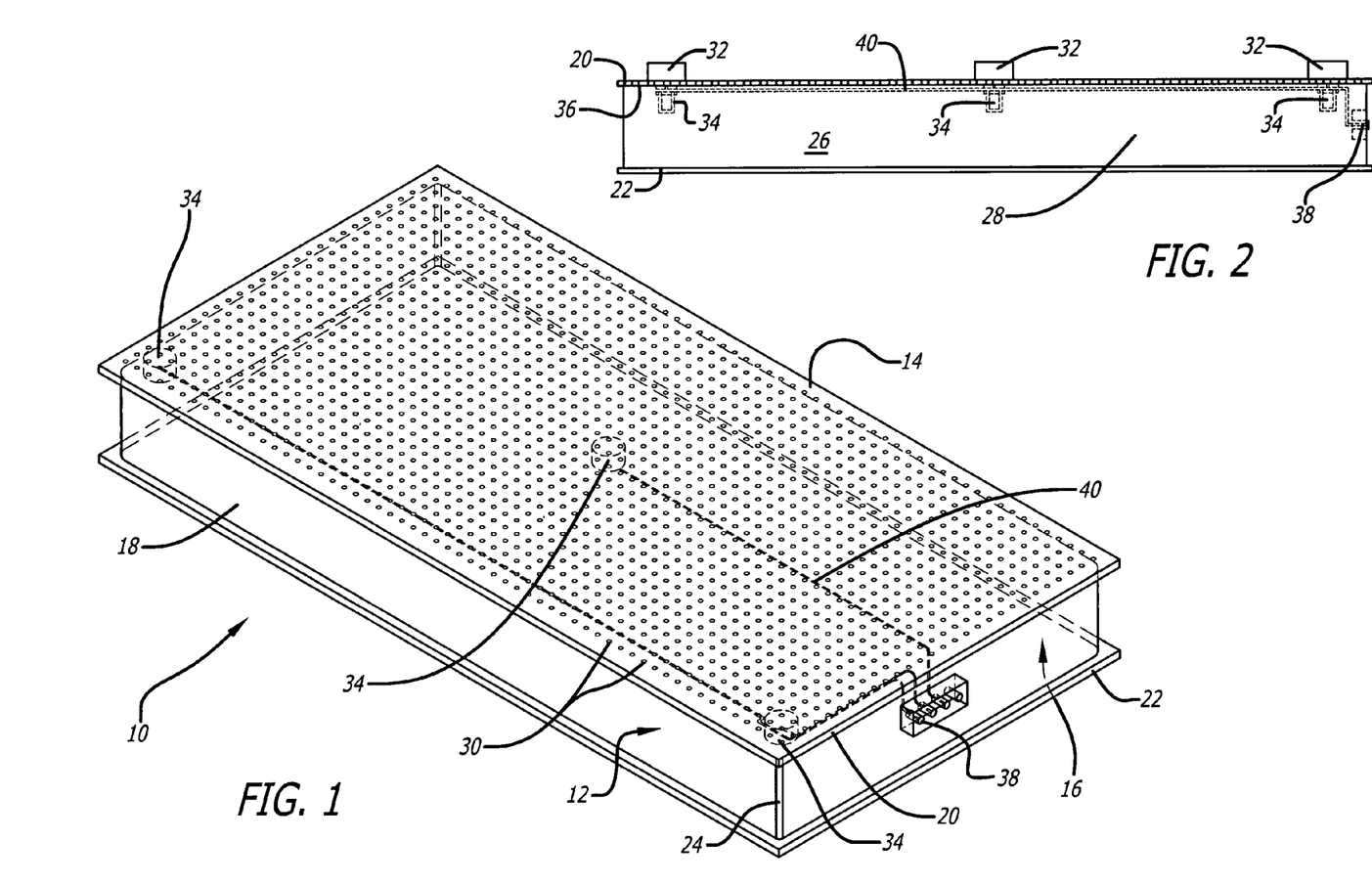
FIG. 1 is a perspective view of a platform.
FIG. 2 is a side sectional view of the platform.

Referring to the drawings more particularly by reference numbers, FIGS. 1 and 2 show a platform 10. The platform 10 may include a table 12 that has a first surface 14, a second surface 16 and a plurality of side surfaces 18. The first surface 14 may extend along a first plate 20, the second surface 16 may extend along a second plate 22 and the side surfaces 18 may extend along one or more side plates 24.

The first plate 20 is separated from the second plate 22 by an inner core 26. The inner core 26 may contain a honeycomb structure 28 to provide support for the plates 20 and 22. The first plate 20 may have a plurality of threaded apertures 30 An external vibration-sensitive payload 32 may be attached to one or more threaded apertures 30 of the table 12. The payload 32 can be any type of device such as an optical component of an optical system, a device under test in a shaker machine, etc. Additionally, the table may be a platform for equipment used to fabricate semiconductor wafers, integrated circuits, etc. In general the table may be any platform used to support a component, system or equipment used in manufacturing or laboratory environments. For purposes of claim interpretation the terms "platform" or "table" do not include any structure of an airplane or building, including airplane wings, fuselage, building walls or foundations.

One or more vibration sensors 34 may be located within the inner core 26 and attached to an underlying surface 36 of the first plate 20, The vibration sensor(s) 34 may be any type of device, such as an accelerometer, a geophone or displacement sensor that can sense vibration. Although three vibration sensors 34 are shown, it is to be understood that any number of sensors 34 can be located at any location of the table. The sensor(s) 34 can be connected to an electrical connector 38 attached to one of the side plates 24 of the table 12. The sensor 34 may be connected to the connector 38 by wire cables 40 that run through the inner core 26. The sensor(s) 34 can provide an output signal that is transmitted to the connector 38 over the cables 40.

Figure 3:
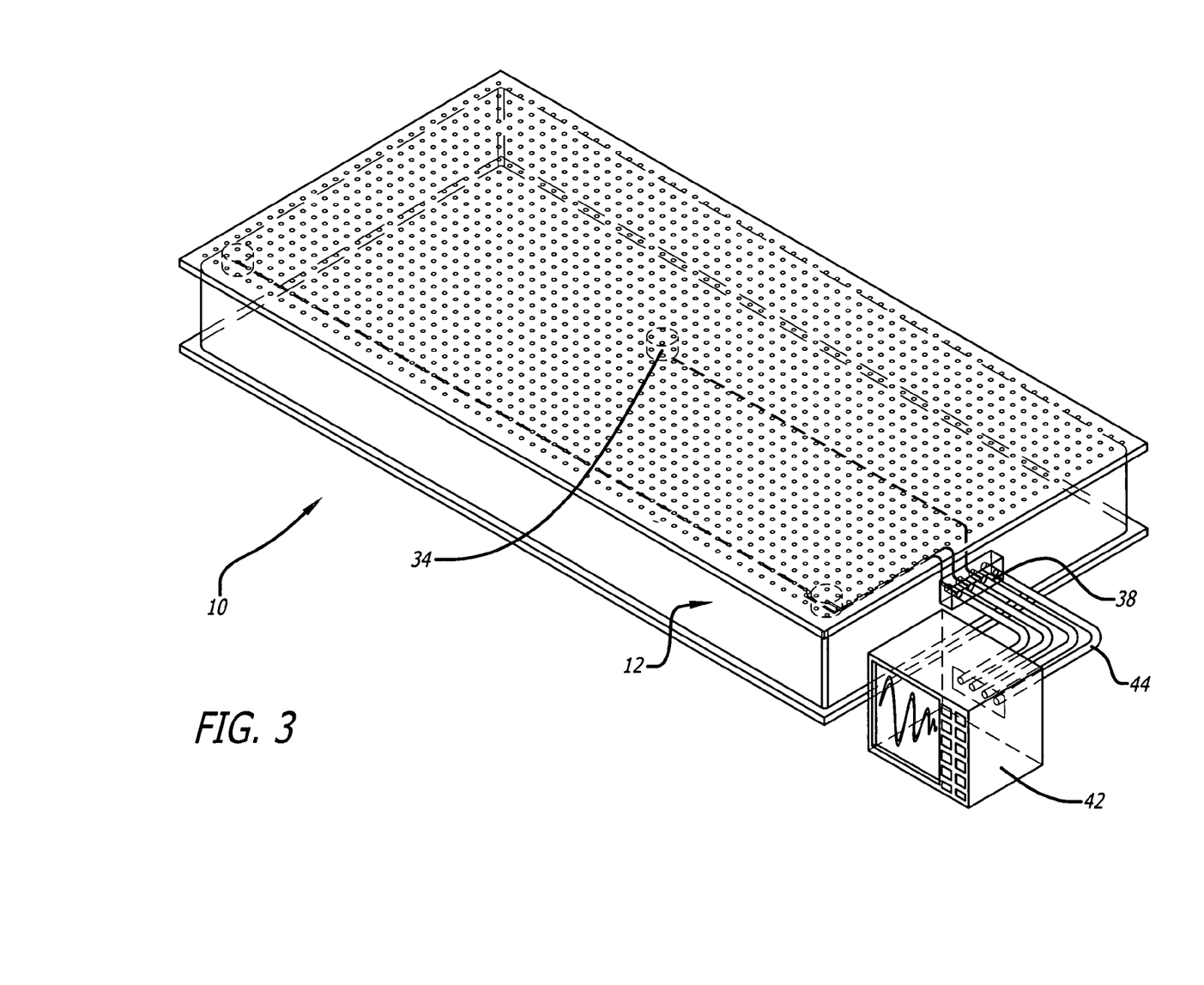
FIG. 3 is a perspective view of the platform coupled to a monitor.

As shown in FIG. 3, a monitor 42 can be coupled to the sensor(s) 34 by plugging cables 44 into the connector 38. The monitor 42 may record and/or display vibration information provided by the sensor(s) 34. By locating the vibration sensor 34 within the inner core 26, the sensor 34 can measure the vibration directly beneath the external device 32 thereby providing more accurate data. The electrical connector 38 allows the monitor 42 to be readily coupled to the sensor(s) 34 thereby minimizing set-up time for monitoring vibration in the table 12. Although cables 40 and a connector 38 are shown and described, it is to be understood that the sensor(s) 34 may have a wireless transmitter (not shown) that wirelessly transmits the output signal(s).

Figure 4:
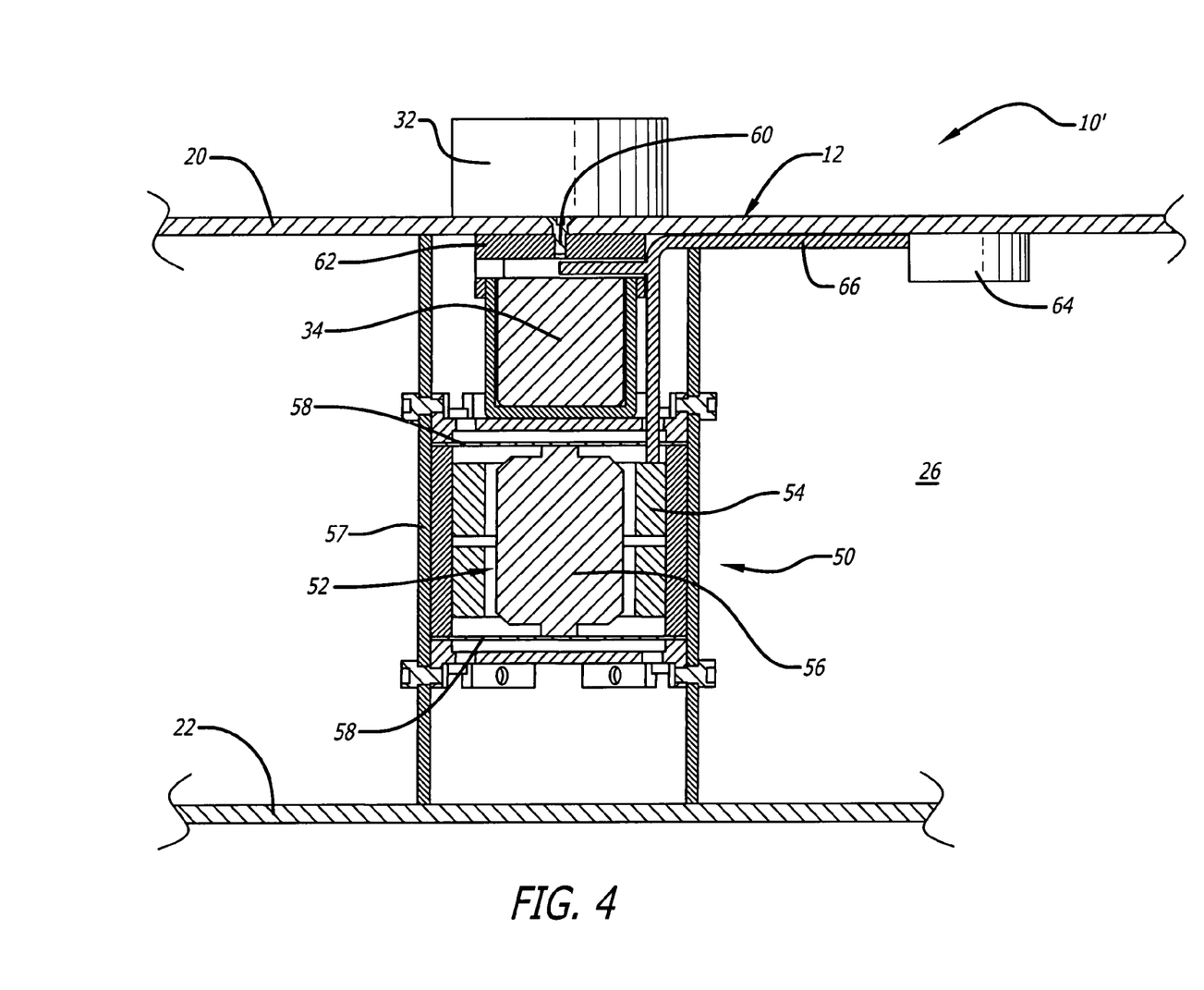
FIG. 4 is a cross-sectional view of an embodiment of platform with a damper in a table core.

FIG. 4 shows an embodiment of a table assembly 10' with a damper 50 located within the inner core 26. The damper 50 may include an actuator 52 such as a voice coil that can be excited to induce a vibration that offsets and cancels the vibration within the table 12. The actuator 52 may include an electrical coil 54 that is magnetically coupled to a magnet mass 56.

The magnet mass 56 may be coupled to an actuator housing 57 by a pair of flexible diaphragms 58. The housing 57 is attached to the plates 20 and 22. That diaphragms 58 function as springs which combine with the mass 56 to form a spring/mass assembly. Providing a current to the coil 54 generates a magnetic force that moves the mass 56. The coil 54 can be excited in a manner to generate, together with the spring/mass assembly, a dynamic force to offset vibration in the table 12.

The vibration sensor 34 can be coupled to the table 12 by a screw 60 That extends through the top plate 20 and is attached to a sensor housing 62. The sensor 60 is preferably coaxial and rigidly coupled to the actuator 52. The sensor 60 provides an output signal to a control circuit 64. The control circuit 64 processes the signal and provides an excitation signal to the coil 54 to generate an offsetting vibration that cancels the table vibration. The control circuit 64 can be located within the inner chamber 26 and connected to the sensor 60 and coil 54 by cables 66.

Figure 5:
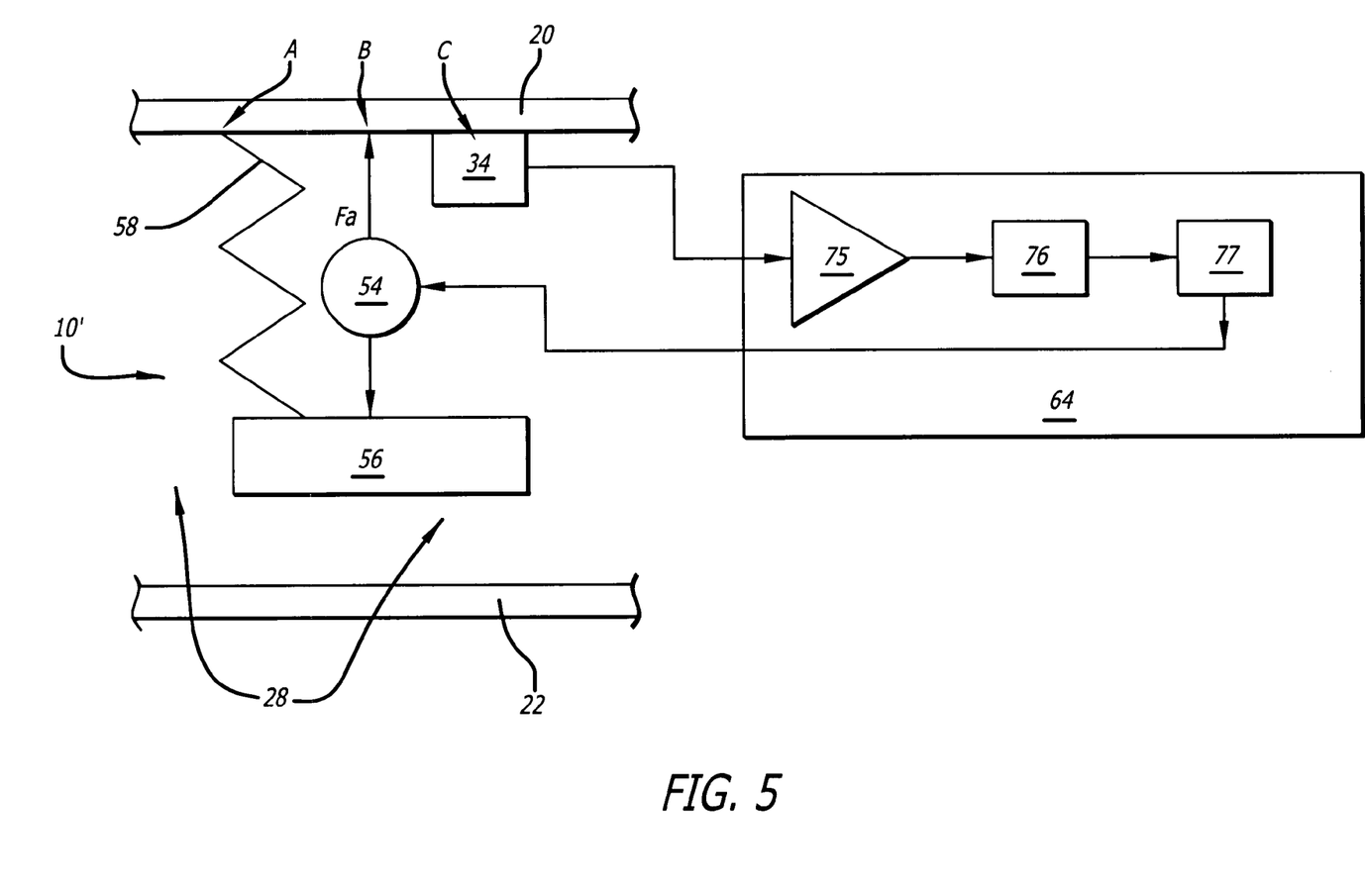
FIG. 5 is a schematic of a controllable damper in the table core.

FIG. 5 is a schematic of a controllable damper integrated into the table 10'. The signal from the vibration sensor 34 is transmitted to the controller 64. The controller 64 may contain amplifiers 75, compensators 76 and filters 77. Digital control or analog control can be employed. The transformed signal is fed into the active element 54, such as a coil, of the actuator incorporated into the table structure. The vibration actuator may further comprise the reaction mass 56, which may contain magnets, and the flexure 58 that provides elastic coupling between the mass and the table. The amplification gains and other parameters of the controller modules are assigned and coordinated with the characteristics of the sensor, actuator and mechanical assembly so that a force Pa induced on the top face sheets of the table reduces the vibration at this point.

As control current flows though the coil 54, the electromagnetic force acts on the reaction mass 56, and the equivalent reaction force is acting on the stationary coils fastened to the table structure. The control loop is designed so that the phase and the amplitude of the summary force transmitted to the table structure counteract the vibration of the table. Methods for designing controller and actuators for vibration abatement are known in the art.

It is preferred that the locations represented by points A,B and C in FIG. 5 be co-axial on the same vertical axis and rigidly connected. It is also preferable to design the control loop so that the active force acting on the table emulates the effect of a viscous damper in the frequency domain encompassing the main natural frequencies of the flexural vibration of the table. This approach creates inherent stability and robustness with respect to the changes in the payload. To implement this strategy, the transfer function of the controller should be designed as:

$$K(\omega) = \frac{-i\omega k}{A(\omega)S(\omega)} \quad (1)$$

Where;

$\omega=2\pi f=$ a circular frequency.

$A(\omega)=$ the actuator (shaker) transfer function, or ratio of the total force N exerted by the actuator on the structure to input voltage, N/V.

$S(\omega)=$ the sensor transfer function, or the ratio of the sensor output voltage to the dynamic displacement, V/m.

$K(\omega)=$ the controller transfer function, V/V.

k=an adjustable gain.

As a result, the force exerted by the active system on the table structure will equal $i\omega ku$, where u is the dynamical displacement amplitude of the table, which is equivalent to the action of the viscous damping. Of course, other units can be used. The sensor may be an accelerometer, a velocimeter (such as a geophone) or a displacement sensor. Additional correcting filters may be used to improve the stability margins or other parameters.

Figure 6:
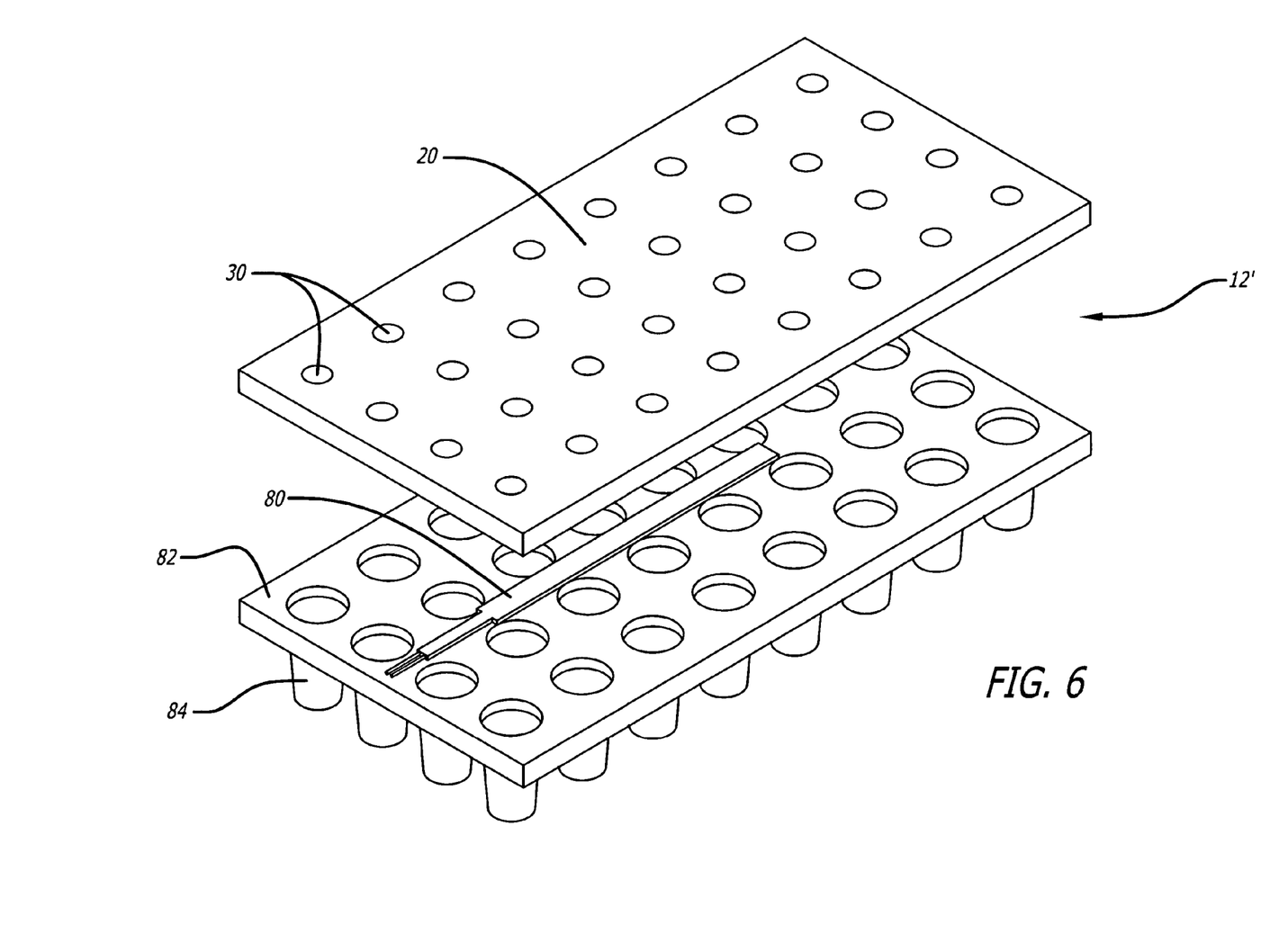
FIG. 6 is a perspective view of an embodiment of the platform.

FIG. 6 shows an alternate embodiment of a table 12 wherein a strip 80 is located between the top plate 20 and a bole sealing file 82. The hole sealing tile 82 may have a plurality of cups 84 that are located adjacent to the threaded apertures 30 to collect debris that fall through the apertures 30. The strip 80 may be a piezoelectric device tat functions as a sensor and/or an actuator. Alternatively, optical cables or other devices may be located between the plate 20 and tile 82 to provide sensing and/or actuating functions. The tile 82 can protect the strip 80 during the manufacturing process of constructing the table 12.

While certain exemplary embodiments have been described and shown in the accompanying drawings, it is to be understood that such embodiments are merely illustrative of and not restrictive on the broad invention and that this invention not be limited to the specific constructions and arrangements shown and described, since various other modifications may occur to those ordinarily skilled in the art.

In particular, the structure referred to as a table may be any kind of a support structure, including multi-level platforms or cradle platforms. The working surface of this support structure may be horizontal, vertical or even inclined. Accordingly, the line of action of the sensors and active dampers can be vertical, horizontal or inclined; multidirectional sensors or active dampers are also possible as a modification of this invention, Although FIG. 4 shows an actuator that is implemented as an electromagnetic shaker with a moving magnet and a stationary coil, other types of actuator designs can be used, in particular, electromagnetic designs with stationary magnets and moving coils, electrodynamic designs with one stationary and one moving coil, etc. Alternatively, stiff (e.g. piezoelectric) actuators can be employed to create a relative motion of the reactive mass and the table.

What is claimed is:

1. A platform assembly that supports a vibration-sensitive payload, comprising:
    a platform having a first surface coupled to a vibration-sensitive payload, a second surface, and a honeycomb inner core located between and coupled to the first and second surfaces; and
    at least one vibration sensor located within said inner core and configured to sense a vibration of a surface of the platform.

2. The assembly of claim 1, wherein said first surface extends along a first plate and said vibration sensor is attached to said first plate.

3. The assembly of claim 1, further comprising an electrical connector attached to an external surface of said platform and coupled to said vibration sensor.

4. The assembly of claim 1, further comprising a damper located within said inner core.

5. The assembly of claim 4, wherein said damper includes an active actuator that is coupled to said vibration sensor.

6. The assembly of claim 5, further comprising a control circuit coupled to said vibration sensor and said active actuator.

7. The assembly of claim 1, further comprising a monitor coupled to said vibration sensor.

8. The assembly of claim 6, wherein said control circuit causes said active actuator to create an active force that emulates an effect of a viscous damper in a frequency domain encompassing a plurality of natural frequencies of a flexural vibration of said first surface.

9. A platform assembly that supports a vibration-sensitive payload, comprising:
    a platform having a first surface coupled to the vibration-sensitive payload, a second surface, and a honeycomb inner core located between and coupled to the first and second surfaces;
    at least one vibration sensor positioned within the inner core and coupled to at least one of the first surface and the second surface;
    a damper positioned within the inner core and coupled to at least one of the first surface and the second surface; and
    a control circuit in communication with the vibration sensor and the damper.

10. The assembly of claim 9, wherein said first surface extends along a first plate and said vibration sensor includes a vibration sensor attached to said first plate.

11. The assembly of claim 9, further comprising an electrical connector attached to an external surface of said table and coupled to said vibration sensor.

12. The assembly of claim 9, wherein said damper includes an active actuator that is coupled said vibration sensor.

13. The assembly of claim 12, further comprising a control circuit coupled to said vibration sensor and said active actuator.

14. The assembly of claim 9, further comprising a monitor coupled to said vibration sensor.

15. The assembly of claim 13, wherein said control circuit causes said active actuator to create an active force that emulates an effect on a viscous damper in a frequency domain of a flexural vibration of said first surface.

16. A platform assembly that supports a vibration-sensitive payload, comprising:
- a platform having a first surface configured to support a vibration-sensitive payload, a second surface, and a honeycomb inner core located between and coupled to the first and second surfaces;
- one or more vibration sensors located within the inner core configured to sense a vibration of a surface of the platform;
- a damper located within the inner core configured to apply a force to a surface of the platform; and
- a monitor in communication with the one or more sensors and the dampener, the monitor configured to receive vibration information from the one or more sensors and provide an excitation signal to the damper.

17. The device of claim 16 further comprising a control circuit coupled to the vibration sensor and the active actuator.

18. The device of claim 17 wherein the damper is configured to apply an active force that emulates an effect of a viscous damper in a frequency domain encompassing a plurality of natural frequencies of a flexural vibration of the first surface in response to the excitation signal from the control circuit in communication with the monitor.

* * * * *